(12) United States Patent
Zhao et al.

(10) Patent No.: US 10,275,479 B2
(45) Date of Patent: Apr. 30, 2019

(54) SPARSE MATRIX STORAGE IN A DATABASE

(71) Applicant: SAS Institute Inc., Cary, NC (US)

(72) Inventors: Zheng Zhao, Cary, NC (US); James Allen Cox, Cary, NC (US); Russell Albright, Spring Lake, MI (US)

(73) Assignee: SAS INSTITUTE INC., Cary, NC (US)

( * ) Notice: Subject to any disclaimer, the term of this patent is extended or adjusted under 35 U.S.C. 154(b) by 721 days.

(21) Appl. No.: 14/633,915

(22) Filed: Feb. 27, 2015

(65) Prior Publication Data

US 2015/0242484 A1 Aug. 27, 2015

Related U.S. Application Data

(60) Provisional application No. 61/945,790, filed on Feb. 27, 2014.

(51) Int. Cl.
*G06F 17/30* (2006.01)

(52) U.S. Cl.
CPC .............................. *G06F 17/30312* (2013.01)

(58) Field of Classification Search
CPC ....................................................... G06F 17/30
See application file for complete search history.

(56) References Cited

U.S. PATENT DOCUMENTS

| 5,206,822 A * | 4/1993 | Taylor ................. G06F 15/8061 708/607 |
| 2014/0108481 A1* | 4/2014 | Davis ...................... G06F 17/16 708/607 |
| 2015/0067009 A1* | 3/2015 | Strauss ................... G06F 17/16 708/203 |
| 2015/0113031 A1* | 4/2015 | Reinwald ................ G06F 17/16 708/520 |

OTHER PUBLICATIONS

Jin et al., "A study of data exchange protocols for the grid computing environment", Third International Conference on Networking and Services (ICNS'07), 2007.*
Mat2str function from Mathworks Retrieved on Apr. 3, 2015 from http://www.mathworks.com/help/matlab/ref/mat2str.html 4 pages.

(Continued)

*Primary Examiner* — Khanh B Pham
(74) *Attorney, Agent, or Firm* — Kilpatrick Townsend & Stockton LLP

(57) ABSTRACT

Methods, processes and computer-program products are disclosed for use in a parallelized computing system in which representations of large sparse matrices are efficiently encoded and communicated between grid-computing devices. A sparse matrix can be encoded and stored as a collection of character strings wherein each character string is a Base64 encoded string representing the non-zero elements of a single row of the sparse matrix. On a per-row basis, non-zero elements can be identified by column indices and error correction metadata can be included. The resultant row data can be converted to IEEE 754 8-byte representations and then encoded into Base64 characters for storage as strings. These character strings of even very large-dimensional sparse matrices can be efficiently stored in databases or communicated to grid-computing devices.

33 Claims, 11 Drawing Sheets

(56) References Cited

OTHER PUBLICATIONS

GNU Octave: Converting Numerical Data into Strings Retrieved on Apr. 3, 2015 from http://www.gnu.org/software/octave/doc/interpreter/Converting-Numerical-Data-to-Strings.html 2 pages.

Quick-R: conversion from Matrix to Data frame Retrieved on Apr. 3, 2015 from http://www.statmethods.net/management/typeconversion.html 2 pages.

Convert Array to String—Unity Answers: Retrieved on Apr. 3, 2015 from http://answers.unity3d.com/questions/182458/convert-array-to-string.html 2 pages.

C# Convert String Array, String retrieved on Apr. 3, 2015 from http://www.dotnetperls.com/convert-string-array-string 4 pages.

Octave: String functions retrieved on Apr. 3, 2015 from http://www.chemie.fu-berlin.de/chemnet/use/info/octave/octave_25.html 4 pages.

edu.northwestern.at.utils.math.matrix: Class MatrixToString retrieved on Apr. 3, 2015 from http://wordhoard.northwestern.edu/userman/javadoc/edu/northwestern/at/utils/math/matrix/MatrixToString.html 9 pages.

Convert.ToBase64String Method: Retrieved on Apr. 3, 2015 from http://msdn.microsoft.com/en-us/library/dhx0d524(v=vs.110).aspx 3 pages.

StackOverflow: Conversion from byte array to base64 and back retrieved on Apr. 3, 2015 from http://stackoverflow.com/questions/11634237/conversion-from-byte-array-to-base64-and-back 3 pages.

StackOverflow: Base64 encoding from byte array to string, what did I do wrong? Retrived on Apr. 3, 2015 from http://stackoverflow.com/questions/12300561/base64-encoding-from-byte-array-to-string-what-do-i-do-wrong 3 pages.

Code Project: Convert byte array into base64 string retrieved on Apr. 3, 2015 from http://www.codeproject.com/Questions/145581/Convert-byte-array-to-base-string 3 pages.

Google Developers: Class Utilities Retrieved on Apr. 3, 2015 from https://developers.google.com/apps-script/reference/utilities/utilities 24 pages.

* cited by examiner

| METADATA VECTORS  406 | | LIST-OF-LISTS VECTORS  406 |
|---|---|---|
| <1, 1> | = | <4, 5.7> |
| <2, 3> | = | <2, 8.4, 3, 1.9, 5, 4.7> |
| <3, 2> | = | <1, 4.6, 6, 8.1> |
| <4, 1> | = | <5, 4> |
| <5, 2> | = | <2, 2.1, 7, 3.1> |
| <6, 2> | = | <3, 5.3, 5, 3.1> |
| <7, 1> | = | <4, 2.18> |
| <8, 3> | = | <1, 5.9, 2, 12, 4, 8.12> |
| <9, 2> | = | <3, 9.7, 6, 11> |

COMPRESSED ROWS OF SPARSE MATRIX – LIST-OF-LISTS
406

$$\begin{bmatrix} 0 & 0 & 0 & 1 & 0 & 0 & 0 & 0 & 0 & 2 & 0 & 0 \\ 1 & 0 & 0 & 0 & 0 & 5 & 0 & 0 & 0 & 0 & 0 & 0 \\ 0 & 0 & 0 & 3 & 0 & 0 & 0 & 0 & 0 & 0 & 0 & 0 \end{bmatrix}$$

902

1 2 4 1 10 2
P/AAAAAAABAGAAAAAAAAAEAQAAAAAAAAP9MzMzMzMzNAJAAAAAAAAD/MKPXCj1wp 2 2 1 1 5 5
QAAAAAAAAAAABAGAAAAAAAAAD/wAAAAAAAAAP9MzMzMzMzNAFAAAAAAAAAD/T1wo9cKPX 3 1 4 3
QAgAAAAAAAABAEAAAAAAAAAAAEAQAAAAAAAAP+zMzMzMzMz0=

ACCESS A REPRESENTATION OF A SPARSE MATRIX, WHEREIN THE SPARSE MATRIX INCLUDES MULTIPLE ROWS AND COLUMNS, WHEREIN EACH OF THE ROWS INCLUDE MULTIPLE ZERO ELEMENTS AND MULTIPLE NON-ZERO ELEMENTS, WHEREIN EACH OF THE ZERO ELEMENTS AND EACH OF THE NON-ZERO ELEMENTS IS INDEXED BY A ROW INDEX AND A COLUMN INDEX, AND WHEREIN THE REPRESENTATION INCLUDES INFORAMTION ABOUT EACH OF THE NON-ZERO ELEMENTS AND THE RESPECTIVE ROW INDICES AND COLUMN INDICES OF THE NON-ZERO ELEMENTS
1002

USE THE REPRESENTATION OF THE SPARSE MATRIX IN PERFORMING THE FOLLOWING OPERATIONS WITH RESPECT TO EACH OF THE ROWS OF THE SPARSE MATRIX:
1004

FORM A PLATFORM-INDEPENDENT BINARY REPRESENTATION OF EACH NON-ZERO ELEMENT OF THE ROW
1006

FORM A PLATFORM-INDEPENDENT BINARY REPRESENTATION OF EACH COLUMN INDEX THAT INDEXES A NON-ZERO ELEMENT OF THE ROW
1008

FORM A SEQUENCE OF BITS THAT REPRESENTS THE ROW AND INCLUDES THE REPRESENTATIONS OF NON-ZERO ELEMENTS AND THE REPRESENTATIONS OF COLUMN INDICES
1010

FORM A CHARACTER STRING THAT REPRESENTS THE ROW, WHEREIN THE CHARACTER STRING IS FORMED BY ENCODING THE SEQUENCE OF BITS USING BASE64 ENCODING
1012

DISTRIBUTIVELY COMMUNICATE THE CHARACTER STRINGS TO GRID-COMPUTING DEVICES IN A GRID-COMPUTING SYSTEM TO FACILITATE PARALLELIZED STATISTICAL ANALYSIS OF THE SPARSE MATRIX
1014

FIG. 11

SPARSE MATRIX STORAGE IN A DATABASE

CROSS-REFERENCE TO RELATED APPLICATIONS

This is a non-provisional of and claims the benefit and priority under 35 U.S.C. § 119(e) of U.S. Provisional App. No. 61/945,790, titled "Sparse Matrix Storage in a Database System". That U.S. Provisional Application was filed on Feb. 27, 2014, and is incorporated by reference herein for all purposes.

TECHNICAL FIELD

Aspects of this disclosure generally relate to the efficient encoding, communication, and storage of sparse matrix rows in a manner suitable for parallel computing operations.

BACKGROUND

Matrices are used in large-scale statistical computing systems and have many applications. In several applications, matrices are used to represent multi-dimensional datasets. Many such data sets include large numbers of data observations but still larger numbers of missing data observations or data points that are otherwise represented by zero, including features of a data observation that are zero. Such matrices are referred to as sparse matrices.

BRIEF SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include computer-program products, systems, and methods for encoding a sparse matrix. In an embodiment, a representation of a sparse matrix can be accessed, wherein the sparse matrix includes multiple rows and columns, wherein each of the rows includes multiple zero elements and multiple non-zero elements, wherein each of the non-zero elements is indexable by a row index and a column index, and wherein the representation includes information about each of the non-zero elements and the respective row indices and column indices of the non-zero elements. The representation of the sparse matrix can be used in performing the following operations with respect to each of the rows of the sparse matrix: forming a platform-independent binary representation of each non-zero element of the row; forming a platform-independent binary representation of each column index that indexes a non-zero element of the row; forming a sequence of bits that represents the row and includes the representations of non-zero elements and the representations of column indices; and forming a character string that represents the row, wherein the character string is formed by encoding the sequence of bits using Base64 encoding. The character strings can be stored or distributively communicated, wherein storing includes storing the character strings in a database, and wherein distributively communicating the character strings include communicating the character strings to grid-computing devices in a grid-computing system to facilitate parallelized statistical analysis of the sparse matrix.

In an embodiment, with respect to each of the rows of the sparse matrix, encoding the sequence of bits using Base64 encoding can include: identifying multiple consecutive and non-overlapping intervals within the sequence of bits, wherein each of the intervals consists of six bytes within the sequence of bits; and mapping each of the intervals to a Base64 character based on the six bytes of the respective interval.

In an embodiment, with respect to each of the rows of the sparse matrix, each of the binary representations of the non-zero elements of the row can comply with an Institute of Electrical and Electronics Engineers (IEEE) 754 format standard.

In an embodiment, with respect to each of the rows of the sparse matrix, each of the binary representations of a column index that indexes a non-zero element of the row can comply with an IEEE 754 format standard.

In an embodiment, the operations can further include appending error correction information to each of the character strings, wherein error correction information appended to a character string indicates a number of non-zero elements in a row of the sparse matrix that is represented by the character string.

In an embodiment, accessing the representation of the sparse matrix can further include performing run-length compression on each the rows of the sparse matrix.

In an embodiment, performing run-length compression on each of the rows of the sparse matrix can include compressing the row using a Lists-Of-Lists format.

In an embodiment, the character strings can be dynamically stored by the grid-computing devices subsequent to being distributively communicated.

In an embodiment, with respect to each of the rows of the sparse matrix, forming a platform-independent binary representation of each non-zero element of the row can include using a List-Of-Lists format.

In an embodiment, the character strings, when stored or distributively communicated, can be held in memory that is dynamically allocated for each of the character strings.

Other embodiments described herein, including combinations of embodiments, can be used.

BRIEF DESCRIPTION OF THE DRAWINGS

Aspects of the disclosure are illustrated by way of example. In the accompanying figures, like reference numbers indicate similar elements, and:

FIG. 6 depicts one example of operations for forming sparse matrix row representations by concatenating compressed sparse matrix rows and corresponding metadata.

FIG. 11 is a flow chart that depicts one example of a sequence of operations for compressing and encoding sparse matrix rows.

DETAILED DESCRIPTION

Figure 1:
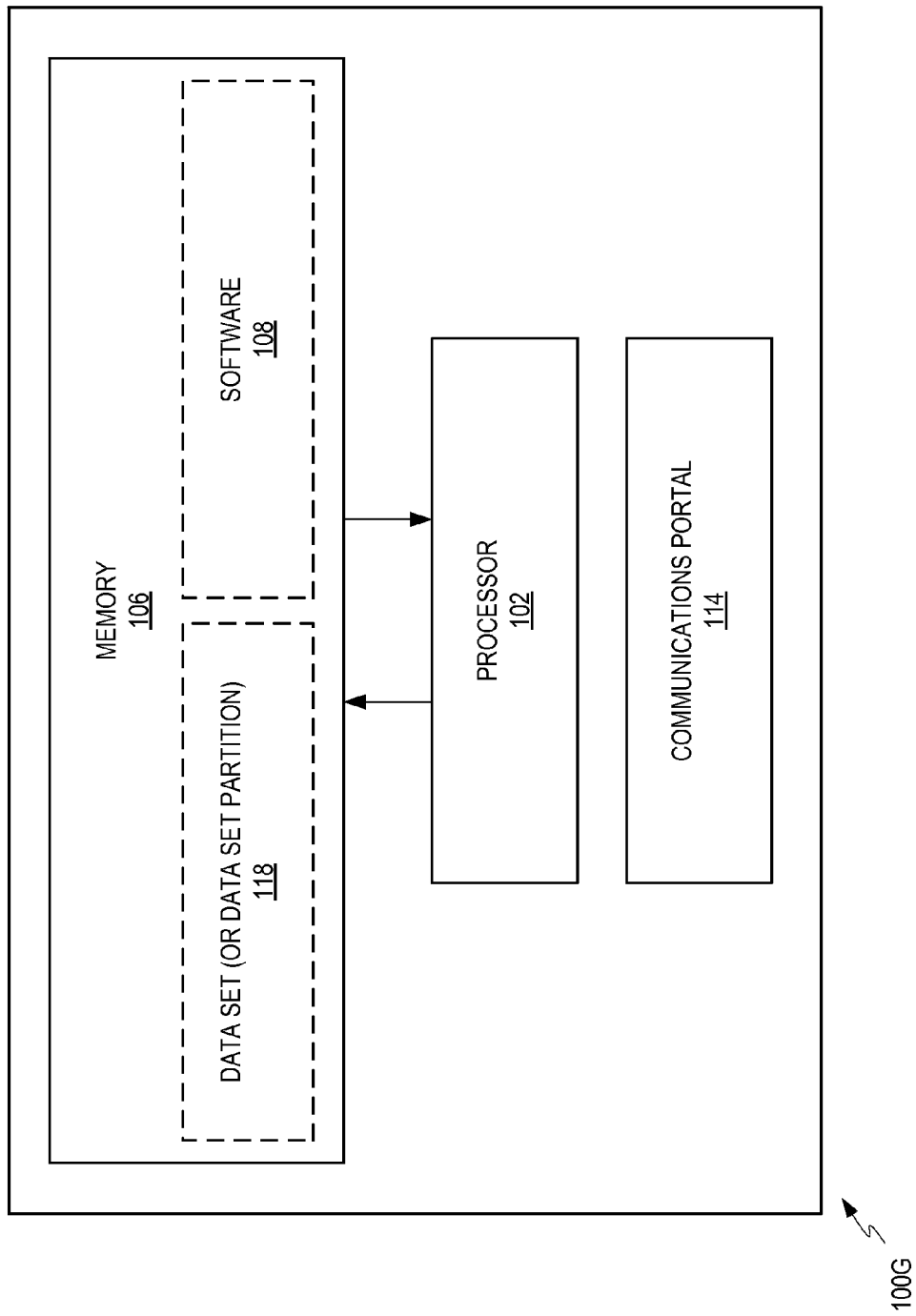
FIG. 1 depicts an example of a grid-computing device configured to be operated within the grid-computing system disclosed herein.

This application describes a parallelized computing system capable of efficiently encoding large sparse matrices, which can be used for the purpose of facilitating distributed matrix operations, for example. Efficiently encoded large sparse matrices can be used, for example, in a relational database system, even allowing a matrix with a very large dimensionality (e.g., above 10,000) to be stored and handled by the database system. Like many parallelized computing systems, the parallelized computing system that is herein described involves a central computing device and multiple grid-computing devices.

The disclosed systems and techniques presented herein can provide improvements in computer technology and other technical fields. Further, the disclosed systems and techniques presented herein provides technical solutions to technical problems.

The grid-computing devices are configured to perform parallelized matrix operations, analysis and computations. So that matrix operations may be parallelized, the central computing device (e.g., central controlling device) partitions the matrix by rows and communicates the various partitions to the grid-computing devices. Each grid-computing device can then process the information within its partition and communicate the results to the central computing device. By receiving and synthesizing the results provided by the various grid-computing devices, the central computing device can obtain computational results for the entire matrix.

When matrices are large, parallelization can achieve significant speedup of certain matrix operations. However, the need to communicate matrix information from a central computing device to multiple grid-computing devices may add significantly to the time-complexity. This may be especially the case, for example, when a matrix is very large because providing each partition to a grid-computing device may entail communicating a substantial amount of data.

In many applications of statistical computing, data mining, and machine-learning, matrix operations are commonly conducted on sparse matrices. Sparse data exist widely in the analytics world for reasons that are easy to understand by way of a few examples.

For instance, take a hypothetical company that has 1,000 products offered for sale and 1,000,000 people on a list of tracked customers. In this case, each of the company's sales can be made in one billion possible ways (customer-product combinations), assuming that products are sold one at a time, and to one customer at a time. Thus, a transaction table in this case would require a billion entries to represent all the possibilities. If the company's sales during a year were made in one million distinct ways, then only 0.1% of the elements in the transaction table would be non-zero.

In text mining, social network analysis, and recommendation systems, data are usually sparse. For example, in the Netflix® Challenge, 17,700 films were made available for users to rate. In this process, 480,189 users provided 103,297,638 ratings. In this case, the data density (the ratio of obtained ratings to all possible film-user rating combinations) was about 1.21%. Thus, more than 98% of the elements in a transaction table used in this case would be zero-valued or null.

Sparse data may pose major challenges with regard to data storage, communication and processing in statistical modeling. Most elements in the design matrix of a sparse data set are zeroes. Therefore, it could be inefficient to store or communicate the full design matrix to perform modeling. For example, assuming that double-precision floating-point format is used to store numbers, 63.6 GB are needed to represent a full design matrix that organizes the Netflix® Challenge data in the example above. In contrast, only approximately 0.77 GB of the 63.6 GB are associated with the nonzero elements. This example shows the huge data savings achievable by storing the sparse design matrix in a compressed or encoded fashion.

To this end, various formats for creating compressed sparse matrix representations have been used in the past. These formats involve storing sparse matrix data in a transactional format (where each row represents one element of the matrix). These formats include the coordinate list (COO) format, which will now be explained for the purpose of later highlighting a few of the technical improvements of the system disclosed herein. The explanation of COO will refer to matrix (A) shown below for the purpose of demonstrating application of the format.

$$A = \begin{bmatrix} 1 & 0 & 2 \\ 0 & 3 & 0 \\ 5 & 0 & 0 \end{bmatrix}$$

Coordinate List (COO) Format

The COO format stores a list of tuples. Each tuple's entries consist of the row index, the column index, and the value of the corresponding matrix element. To support quick lookup, the tuples are usually grouped by row index and are sorted by column index. Matrix A has the following representation in this format:

$$A = \begin{Bmatrix} \{0, 0, 1\} \\ \{0, 2, 2\} \\ \{1, 1, 3\} \\ \{2, 0, 5\} \end{Bmatrix}$$

The COO format is suitable for storing a sparse matrix in a relational database because the database table needs to have only three columns and the number of rows is equal to the total nonzero elements in the matrix.

However, in big-data analysis, storing sparse data and distributing it across a distributed computing environment presents extra challenges that may be difficult to address with certain formats. For example, most distributed matrix operations require that all elements from a same row of the design matrix be distributed on the same grid system node to avoid fragmented distribution of rows. When data are not distributed in this way, computation may generate meaningless results.

For example, when handling large-scale problems, SAS high-performance analytical procedures perform distributed computing in a grid environment. Data that are used by these procedures are either predistributed onto a distributed database on a grid or distributed to the grid when the procedures are launched for computation. In many database systems, these data are distributed in a round-robin style in which each tuple or row (tn) is distributed to a different node than tuple tn+1. Thus, certain formats, such as a transactional format, are used to create a compressed sparse matrix representation, data (e.g., a tuple, in the case of COO) that represents one element of the matrix may be sent to one grid node, while data that represents another element from the same row of the matrix is sent to another grid node. Transactions associated with a particular object will typically not be distributed to the same node in the grid.

The grid-computing system described herein incorporates an approach that involves using a List-of-Lists format to implement run-length compression of individual rows in a sparse matrix, followed by Base64 encoding of the compressed rows. The List-of-Lists format effectuates run-length encoding by using the redundancy that results from the many long series of consecutive zero elements in sparse matrices. The List-of-Lists format involves explicitly communicating the value and column addresses of non-zero elements. Compression can be achieved because bits are not used to explicitly communicate the location of zero elements. At least for this reason, the lengths of the compressed messages can vary depending on the number of non-zero elements in the row.

The explanation below will refer to the matrix (A) shown below for the purpose of depicting the List-of-Lists formatting of sparse matrix rows.

LIST-OF-LISTS (LIL)

The LIL format stores one list per row. In each list, an entry stores a column index and the value of the corresponding element. To support quick lookup, the entries in the list are usually sorted by their column index. Given a matrix (A) as follows:

$$A = \begin{bmatrix} 1 & 0 & 2 \\ 0 & 3 & 0 \\ 5 & 0 & 0 \end{bmatrix}$$

the matrix has either of the following representations when the List-of-List (LIL) format is used:

$$A = \begin{pmatrix} (\{0, 1\}, \{2, 2\}) \\ (\{1, 3\}) \\ (\{0.5\}) \end{pmatrix},$$

$$A = \{ <0, 1, 2, 2>, <1, 3>, <0, 5> \}.$$

Because matrix A is minimally sparse, LIL provides no significant compression in the case of the example above. Nonetheless, the compression provided by LIL increases with increasing matrix sparseness.

The LIL format can be good for incremental matrix construction for example. For instance, it is easy to add new rows and new columns to the matrix by expanding the lists. However, storing this data structure in a relational database can be inefficient because the number of the elements in the rows of the matrix vary dramatically from one row to another. Also, many database systems may limit the maximum number of columns in a data table to a few thousand. When the maximum number of nonzero elements in a row of a sparse matrix exceeds the number of columns that a database system supports, it can become difficult to store the matrix in a database table.

At least for this reason, the system can employ Base64 encoding to further encode each compressed row into a character string format. The Base64 encoding results in each compressed row being represented as a character string that can be communicated to and dynamically stored at any location in a grid-computing system. When, as in most cases, the memory required to hold a string is dynamically allocated, individual grid-computing devices can receive and store representations of entire rows, regardless of the data distribution scheme in place and any database limitations that might make another format such as COO unworkable. Each such character string that can be decoded and decompressed to recreate the original sparse matrix row in its entirety. Thus, the encoding used by the system can enable a sparse matrix to be distributed in a grid-computing system in a way that avoids fracturing of sparse matrix rows.

In addition to enabling the avoidance of row fracturing during partitioning and distribution of sparse matrices, the system's compression and encoding of sparse matrix rows can substantially reduce the amount of data needed to be transmitted and the latency involved in the communication. By reducing the amount of data involved in the communication of sparse matrix rows, overall matrix operations involving sparse matrices can be sped up substantially. Also, because the compression involves representing each row as a single character string, sparse matrix rows can be stored dynamically in a grid-computing system. By storing these strings dynamically, the grid-computing devices are able to use their available memory more efficiently.

FIG. 1 is a diagram of a grid-computing device 100 that is configured to operate within the grid-computing system disclosed herein. The grid-computing device includes a processor 102, a communications portal 114, and a memory 106. The grid computing device is configured to store software 108 within memory 106. The software 108 may be executed by the processor 102 in order to perform any number of computations and operations of the type commonly associated with statistical computing, machine-learning, data mining, and other tasks. The software 108 may also include interfacing instructions that, when executed, enable the processor 102 to communicate, synchronize and interface with other grid-computing devices.

Decoding and decompression instructions in the software 108 enable the processor 102 to receive compressed sparse matrix rows encoded as Base64 character strings. Using these instructions, the processor 102 can then convert each character of the string to a six-byte message using Base64 decoding, and then form a composite bit string by concatenating all six-byte messages resulting from the decoding. Because the composite bit string is actually a binary representation of a compressed sparse row matrix, the software 108 includes decompression instructions for recreating the complete sparse row matrix from the compressed binary representation.

When a grid-computing device recreates a complete sparse matrix row, the processor 102 may store the row as part of a data set 118 that resides in memory. Within the data set 118, the row is stored intact and in continuous memory so that elements of the row may be serially processed.

In some circumstances, the data set 118 may also include additional rows from the original sparse matrix. For example, the data set 118 may include additional rows of a sparse matrix when the number of matrix rows is greater than the number of grid-computing devices that will contribute to the distributed processing of the matrix.

At any time after a complete sparse matrix row is stored in memory 106, the processor 102 may process the row data in any number of ways. For example, the processor 102 may perform addition operations, multiplication operations, comparison operations, data transfer or any other operations needed to execute functions or algorithms for statistical processing, vector arithmetic, linear algebra, matrix operations, or any other form of mathematical or analytical operation. As one example, the processor 102 may average the values found within a row, count the number of non-zero values found within a row, or calculate an average of the nonzero values. As another example, the processor 102 may perform an element by element comparison of values in two different rows of a same sparse matrix, and sum these differences across all elements of the rows.

Figure 2:
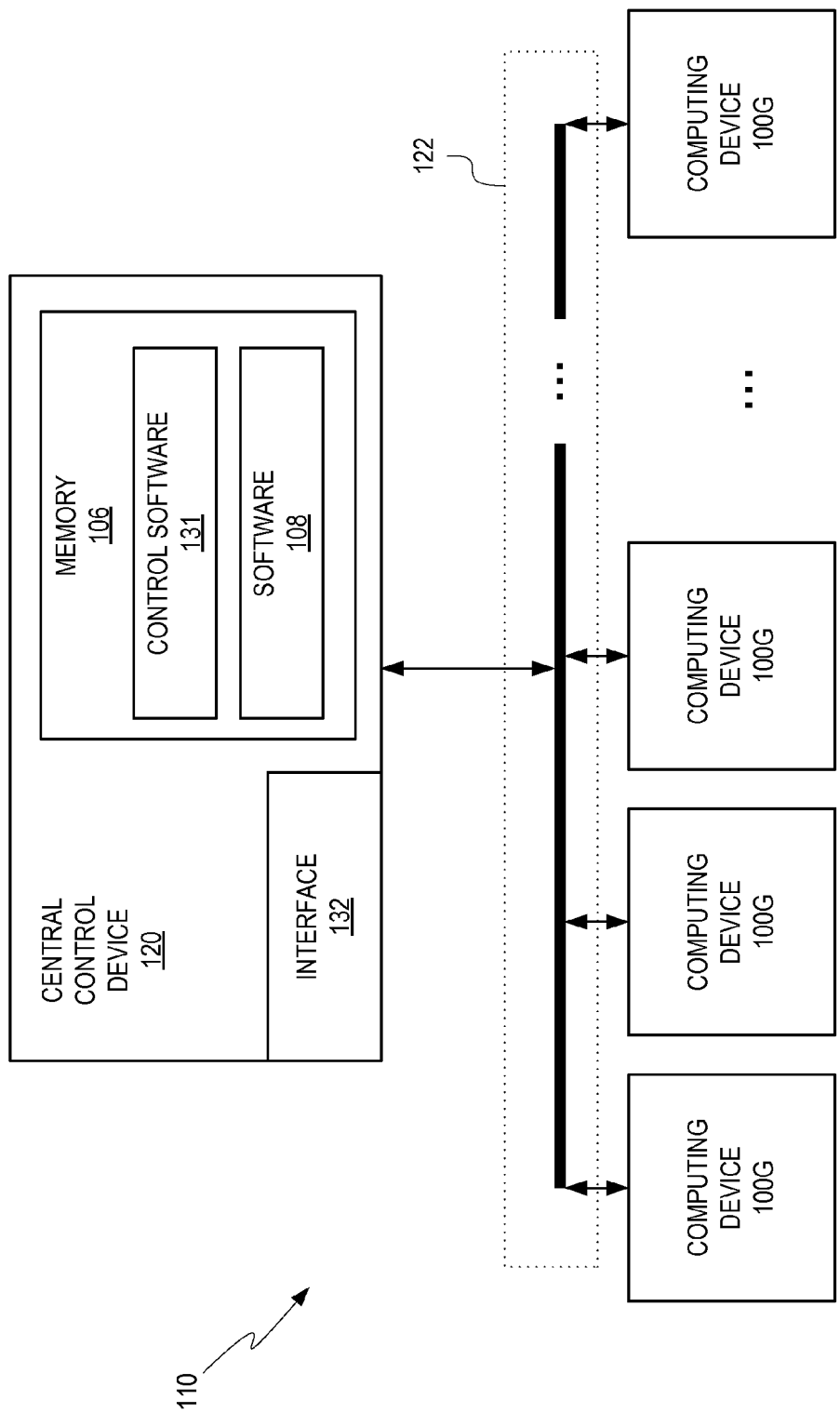
FIG. 2 depicts an example of a grid-computing system in which compression and encoding sparse matrix information may be used to improve and accelerate communication of the information within the system.

FIG. 2 depicts a grid-computing system 110 that includes a central control device 120 and multiple grid-computing devices 100G. Within the grid-computing system 110, the central control device 120 includes a memory 106 that stores software 108 and control software 131. The control software 131 includes instructions that the central control device 120 executes to initiate and control parallelized matrix operations. These parallelized computing operations may involve each grid-computing device 100G performing row operations involving one or more rows of the matrix, and communicating the processing results to the central control device 120 to be synthesized, outputted, or to be used as part of further row or matrix operations.

In certain parallelized processing operations, a sparse matrix is initially stored only in the memory 106 of the central control device 120. In such cases, the central control device 120 partitions the sparse matrix by rows so that each partition includes a complete row. Within each partition, each row is then compressed, and encoded as a character string. The character strings that represent the rows of a partition are then communicated to a same grid-computing device 100G.

The control software 131 includes instructions executed by the central control device 100G to read a sparse matrix from memory 106, communicate with grid-computing devices 100G to identify devices available for processing, and partition the sparse matrix based on the information about devices available for processing. The control software 131 also includes instructions for performing the compression and encoding of the partitions, communicating the compressed partitions, and commanding the processing operations to be performed by the grid-computing devices 100G on the data in their respective partitions. When the central control device 120 receives processing results from the grid-computing device 100G, the central control device 120 executes additional instructions within the control software 131 for synthesizing or aggregating the results to assemble a final computational output or result applicable to the entire sparse matrix.

The grid-computing devices 100G are connected to each other and to the central control device 120 by a data bus 122 or other communications channel. The central control device 120 transmits data and control information on the data bus 122 so that it may be received by the grid-computing devices 100G. Certain grid-computing devices 100G may be configured to relay data to other grid-computing devices 100G. Additionally, or alternatively, the central control device 120 may use the data bus 122 to broadcast data or control information. When data or information is broadcasted in this way, it can reach the grid-computing devices 100G without the need for relaying.

Figure 3:
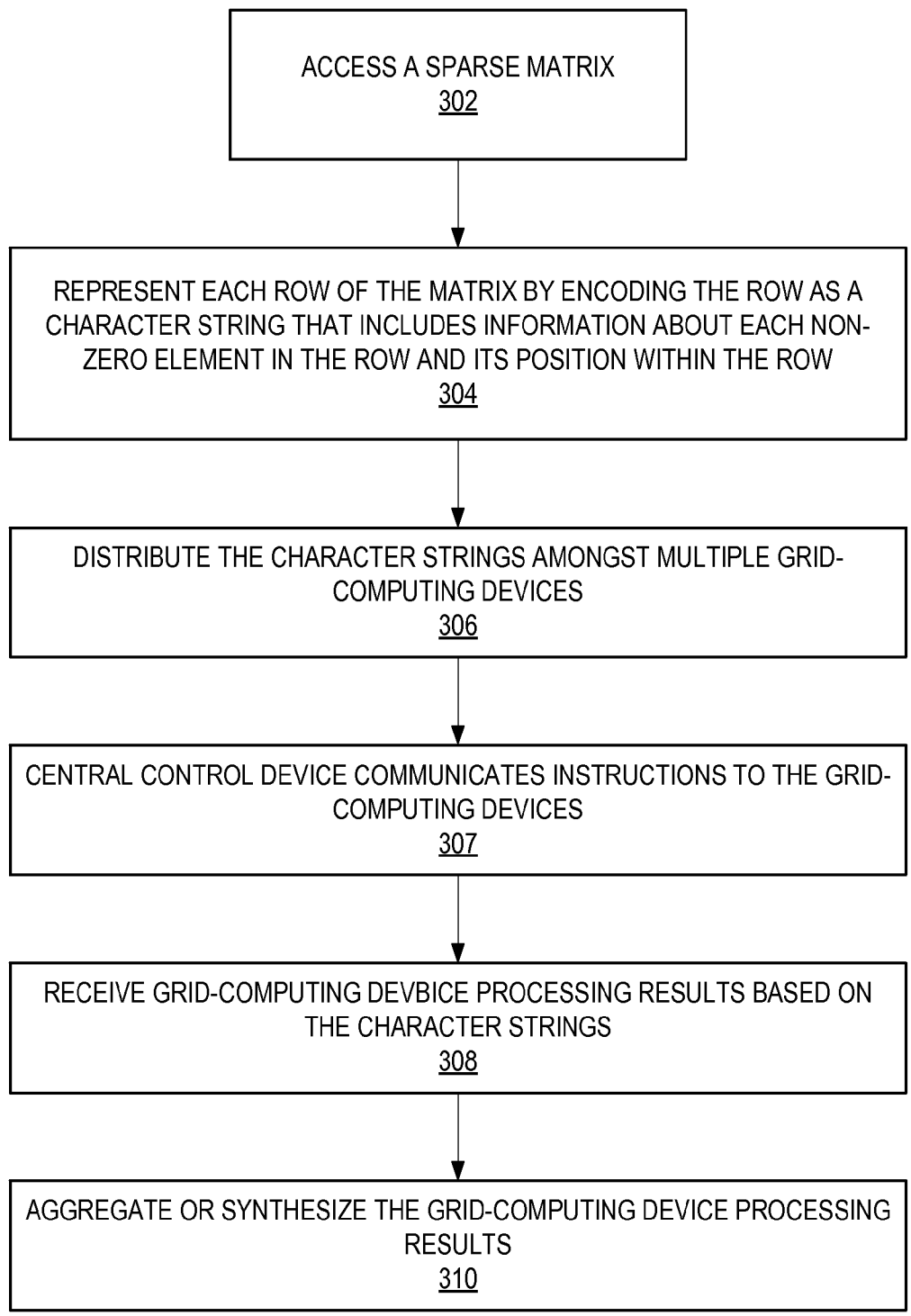
FIG. 3 is a flow diagram that provides a generalized depiction of an example of parallelized statistical computing operations that involve the use of compressed and encoded sparse matrix row information.

FIG. 3 is a flow diagram that provides an example of a generalized depiction of a sequence of grid-computing operations that involve the compression and encoding of sparse matrix rows to speedup parallelized processing utilized in addressing a large computational problem. At 302, a central control device 120 accesses a sparse matrix. The central control device 120 can access the sparse matrix from memory or directly from an input or interface buffer. At 304, the central control device 120 represents each row of the matrix by encoding the row as a character string that includes the value and column address (index) of each non-zero element in the row. As will be described in greater detail in an explanation of FIGS. 4-8, the encoding of each row involves row compression using a List-of-Lists format, followed by further encoding using the Base64 encoding scheme.

At 306, the central control device 120 distributes the unique character strings amongst the grid-computing devices 100G that are available to perform processing within the grid-computing system 110. At 307, the central control device 120 communicates instructions to the grid-computing devices 100G. The instructions inform the grid-computing devices 100G of the row operations or any other operations that the devices are to perform using the data in their respective rows. The grid-computing devices 100G then perform the distributed processing as instructed by the central control device 120. The processing that occurs at each grid-computing device 100G yields processing results that are relevant to the overall problem or operation being addressed by the grid-computing system 110.

At 308, the central control device 120 receives results of the parallelized processing performed by the grid-computing devices 100G. At 310, the central control device 120 aggregates or synthesizes the parallelized processing results to obtain a solution or an aggregated result with regard to the overall computational problem involving the entire sparse matrix.

Figure 4:
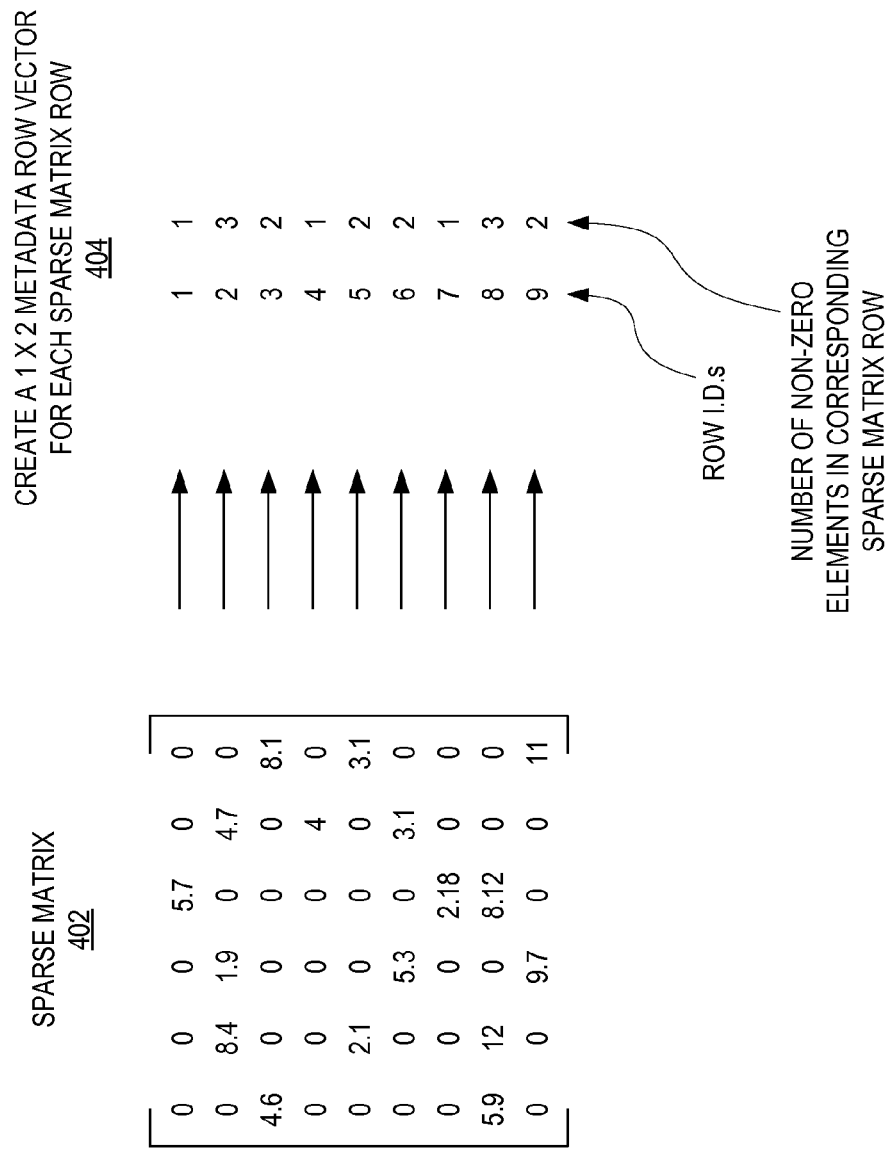
FIG. 4 depicts derivation of metadata about the number of nonzero elements of a row during the process of compressing and encoding sparse matrix rows.

FIGS. 4-8 depict a series of operations for compressing and encoding sparse matrix rows so that each row is fully represented by a single character string. The operations may be performed by a central control device 120 within a parallelized or grid-computing system, such as the one depicted at 110 in FIG. 2 At 402, FIG. 4 illustrates an example of a 9×6 sparse matrix. The sparse matrix 402 includes both elements that are zero-valued and elements that are not zero-valued. However, the number of elements that are zero-valued is substantially greater than the number of elements that are not zero-valued. In actual application of the system or methods described herein, a sparse matrix may commonly contain many more elements than matrix 402. Additionally, in actual applications, the proportion of zero to non-zero elements in a sparse matrix may be much larger than the corresponding proportion in matrix 402.

FIG. 4 also depicts operations of the process of compressing and encoding the rows of the sparse matrix 402. A particular operation is shown at 404, and involves creating a 2-element metadata vector for each row of the sparse matrix 402. Within each metadata vector, the first element is an integer that represents the row address of the corresponding sparse matrix 402 row. Thus, in the metadata vector created with respect to the first sparse matrix 402 row, the first element is 1. In the metadata row created with respect to the second sparse matrix 402 row, the first element is 2 and so on.

In each metadata vector, the second element holds the number of non-zero elements found in the corresponding row of the sparse matrix. By including this information in the metadata vectors, the central control device 120 provides error correction information that enables grid-computing devices 100G to determine when a sparse matrix row has been erroneously decoded. Grid-computing devices can compare the encoded or decoded sparse matrix row information to the number of non-zero elements as included in the metadata vector to determine whether an error has occurred (e.g., if the number of non-zero elements in the actual sparse matrix row is different from the number of non-zero elements as included in the metadata vector). Various other types of metadata can be added instead or in addition, such as metadata including cyclic redundancy check information.

As one example of how the second element of a metadata vector is determined, FIG. 4 shows that in the metadata vector corresponding to the first sparse matrix 402 row (row/vector correspondence is indicated by the horizontal arrows in FIG. 4), the second element is 1 because there is only a single non-zero element (5.7) in the first row of sparse matrix 402. Similarly, FIG. 4 shows that in the metadata vector that corresponds to the eighth sparse matrix 402 row, the second element in the metadata row is 3 because there are three non-zero elements (5.9, 12, 8.12) in the eight row of the sparse matrix 402. When the operations of FIG. 4 are used in the case of a sparse matrix having r rows, the result is a set of r 1×2 metadata vectors.

Figure 5:
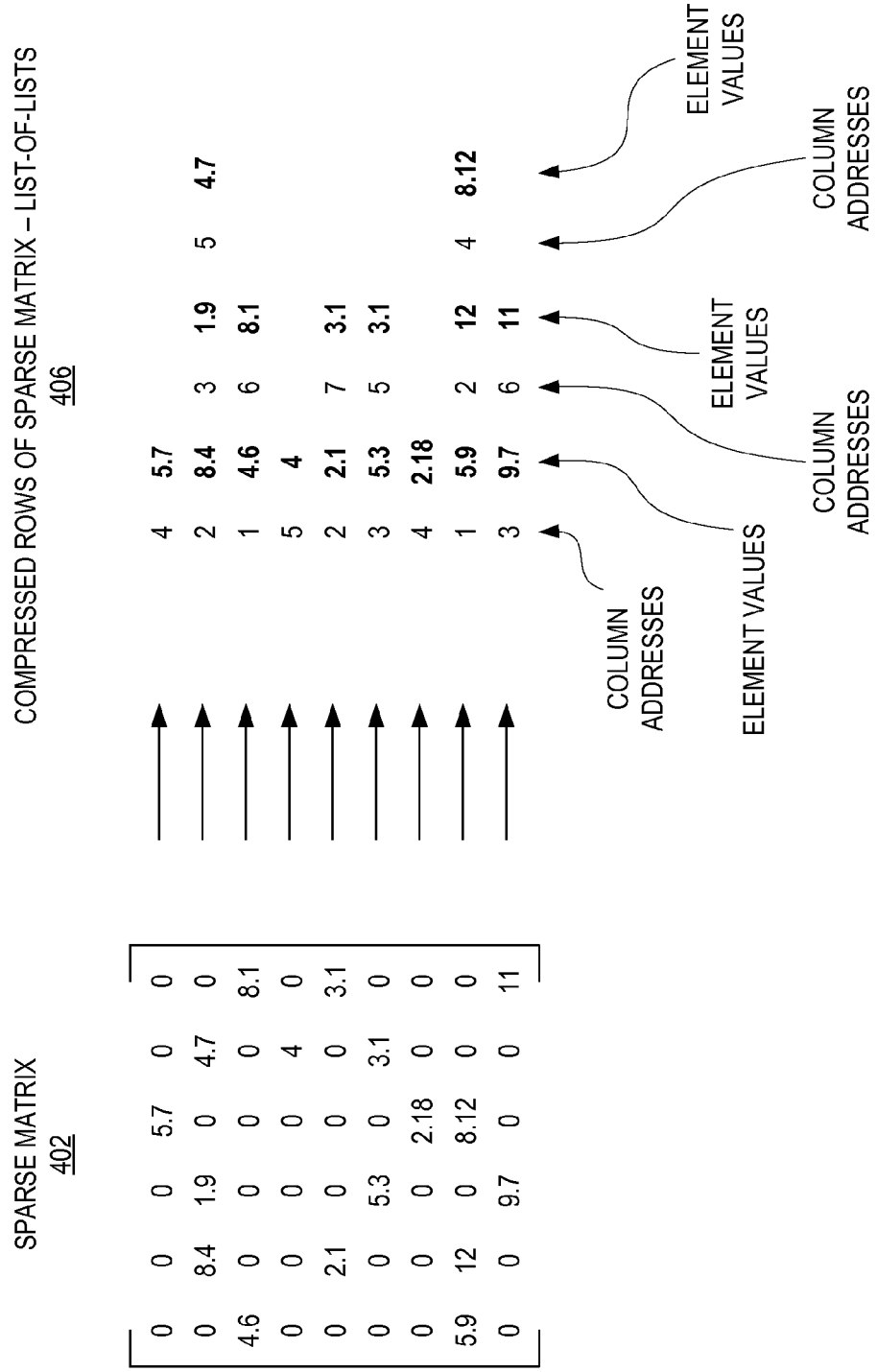
FIG. 5 depicts one example of forming compressed sparse matrix rows.

FIG. 5 depicts additional example operations in the process of compressing and encoding the rows of sparse matrix 402. The operations depicted in FIG. 5 relate specifically to the compression of the numerical data in the rows through the use of the LIL format.

FIG. 5 depicts the sparse matrix at 402. The operations depicted in FIG. 5 involve compressing each row of the sparse matrix 402 by following the List-of-Lists compression scheme that was explained earlier. Each compressed row 406 holds a number of elements equal to twice the number of non-zero elements in the original row of the matrix. The elements include only the column addresses of the non-zero elements in the represented matrix row, and the non-zero elements themselves. Thus, the compressed rows omit explicit information about the zero elements of the sparse matrix, as prescribed by the List-Of-List compression scheme.

The data in the compressed rows is ordered so that column addresses alternate with non-zero element representations, and each non-zero element representation is directly preceded by its column address. Moreover, the sparse matrix non-zero elements appear within the compressed rows in the same order in which they appear in the rows of the sparse matrix, which can be advantageous in certain applications, such as when used with algorithms that require the elements in a row to be ordered by their column address. In some cases, the sparse matrix can be encoded such that the non-zero elements do not necessarily appear within the compressed rows in the same order in which they appear in the rows of the sparse matrix. Thus, for a row having n non-zero elements $\{e_1, e_2, \ldots e_n\}$ where each non-zero element $e_p$ has a column address $a_p$, the row representation is $<a_1, e_1, a_2, e_2, \ldots a_n, e_n>$. At 406, element values of the compressed rows appear in bold text, while column addresses appear in standard text.

FIG. 6 depicts additional example operations that may be performed by the central control device 120 during the compression and encoding of the rows of sparse matrix 402. Because the operations depicted in FIG. 6 are dependent on the results of the operations depicted in FIGS. 4-5, the central control device 120 completes the operations depicted in FIG. 4 and FIG. 5 prior to commencing the operations of FIG. 6. The operations depicted in FIG. 6 involve the central control device 120 concatenating each compressed row 406 and its corresponding metadata row vector 404. These operations yield a row representation vector for each row of the original sparse matrix, as depicted at 502.

Each of the row representations 502 includes the row index of the corresponding sparse matrix row and error correction information, such as that described above with reference to FIG. 4, stored in the first and second elements, respectively. Each of the row representations 502 also includes the complete List-of-Lists compressed version of the corresponding sparse matrix row, which appears in the third through final elements of the row representation.

Figure 7:
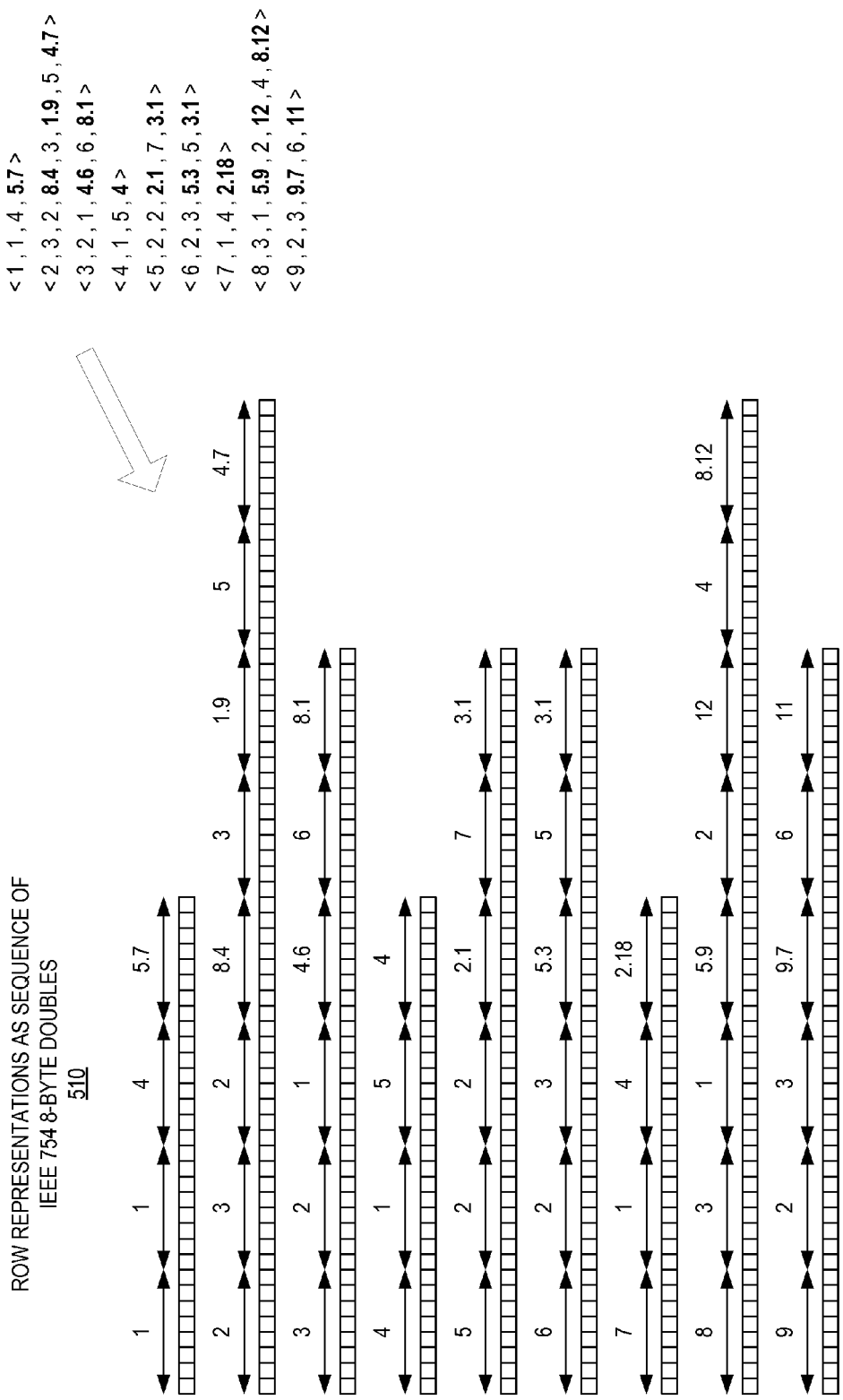
FIG. 7 depicts one example of using sequences of IEEE 754 8-byte doubles to format the sparse matrix row representations of FIG. 6.

FIG. 7 depicts an example of the formatting of row representations 502 as binary sequences of IEEE 754 8-byte doubles 510. To represent a row representation 502 as a binary sequence of 8-byte doubles, the central control device 120 formats every number appearing in the row representation as an IEEE 8-byte double. The various 8-byte doubles are then concatenated to form a composite binary sequence in which the 8-byte doubles appear in an order consistent with the ordering of their corresponding numbers in the row representation 502. Thus, when these procedures are used, any row representation having n numbers will itself be represented by 8n bytes when formatted as a sequence of IEEE 754 8-byte doubles. The resultant binary double array that is encoded using IEEE 754 is a platform-independent binary representation because the double array has the same binary representation across different platforms.

Figure 8:
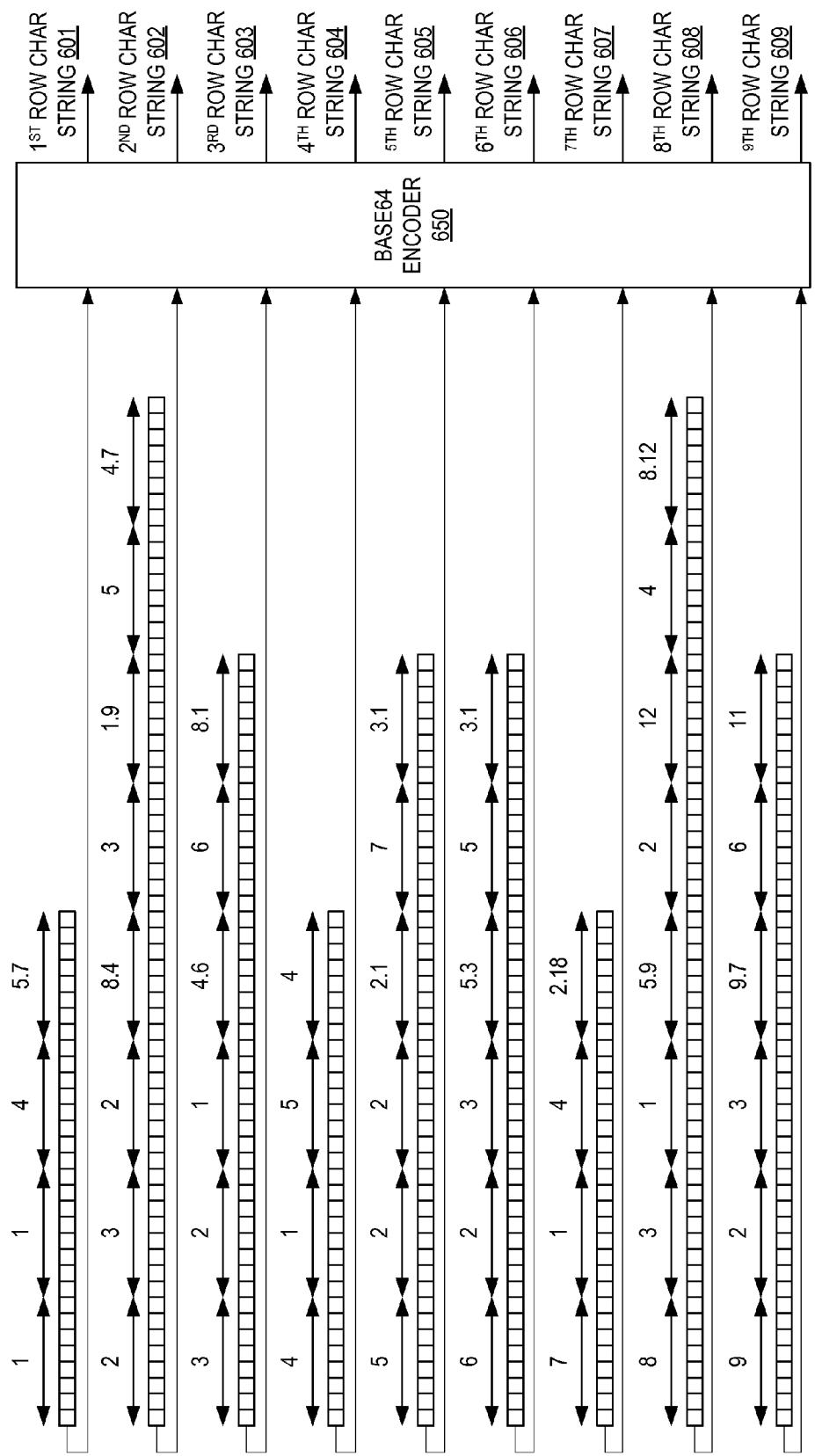
FIG. 8 depicts an example that uses Base64 encoding to encode the sequences of IEEE 754 8-byte doubles shown in FIG. 7.

FIG. 8 depicts the encoding of the binary sequences 510 previously shown in FIG. 7. As shown in FIG. 8, each of the binary sequences 510 is individually encoded using Base64 encoding, which is represented by the Base64 encoder 650. The Base64 encoding of each binary sequence 510 involves dividing the sequence into consecutive, non-overlapping blocks 6-bytes wide, and mapping each block to the appropriate ASCII character provided by the Base64 encoding scheme. To the extent that the number of bytes is not evenly divisible into 6-byte intervals, padding characters can be used in the encoded Base64 string.

The result of this encoding is a group of character strings 601, 602, . . . 609, each of which corresponds to a particular row in the original sparse matrix 402 and includes all information necessary to reassemble the corresponding row at a grid-computing device 100G, as well as identify the row's location in the sparse matrix 402.

Once a central control device 120 has encoded each row as a character string, it may then distribute the sparse matrix in the grid-computing system 110 by communicating each character string to a particular grid-computing device 100G.

Regardless of what type of scheme guides the distribution process, the distribution will not result in the partitioning of any single row amongst more than one grid-computing device because every row is comprehensively represented by a single character string.

Figure 9:
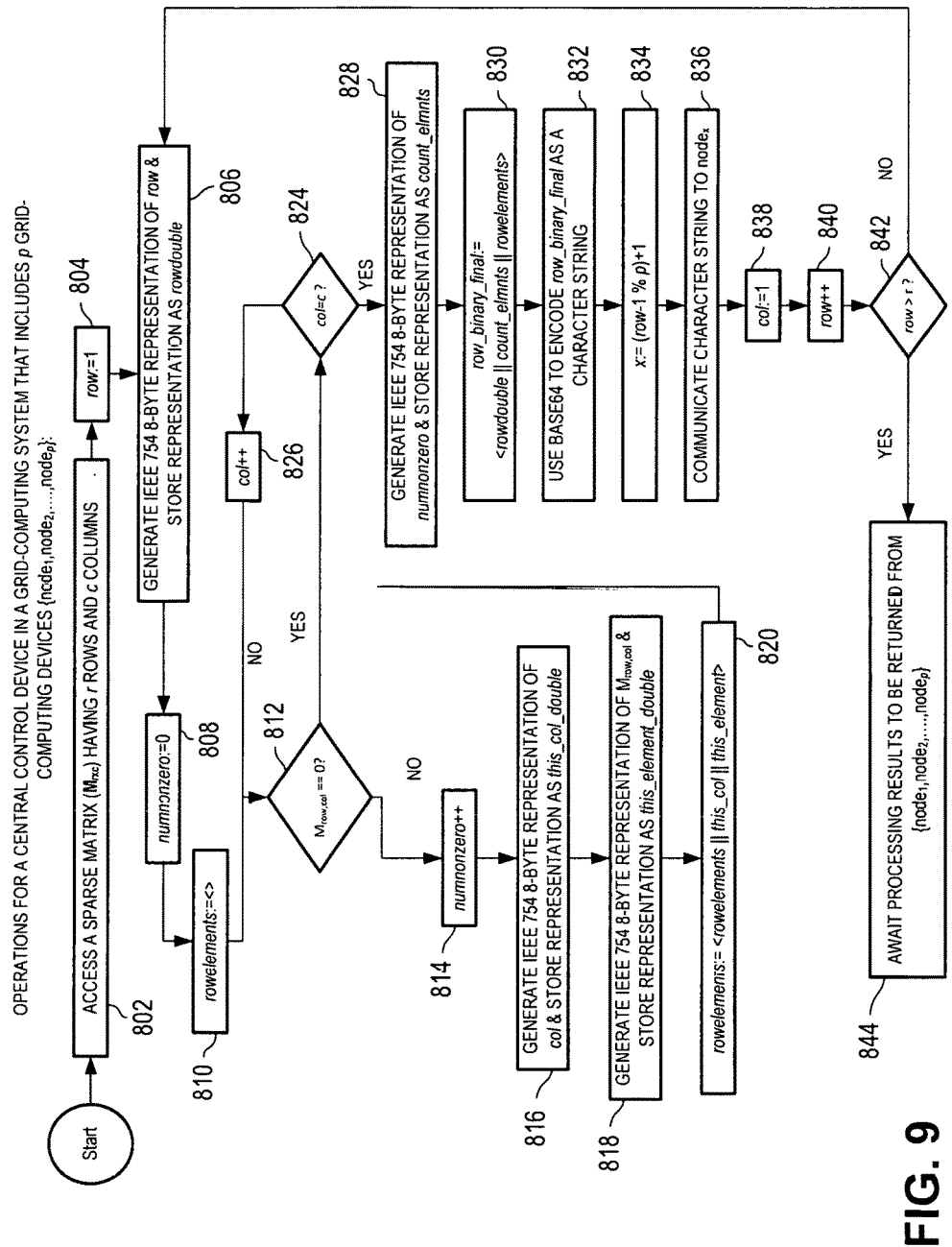
FIG. 9 is a flow chart that depicts an example of an algorithm for compressing and encoding the rows of a sparse matrix.

FIG. 9 a flow chart that depicts an example of an algorithm for compressing and encoding the rows of a sparse matrix at a central control device. The algorithm represented by the flow chart involves Base64 encoding and yields a character string representation of each sparse matrix row.

Moreover, each character string yielded by the algorithm represents an entire sparse matrix row. As a result of this feature, individual grid-computing devices can be provided with information for recreating entire sparse matrix rows, even in software environments where the scheme for communicating matrix information between a central computing device and grid-computing devices is not flexible.

The operations depicted in FIG. 9 can be performed by a central control device 120 or individual worker nodes in a grid-computing system having a number (p) of grid computing devices $\{node_1, node_2, \ldots node_p\}$, such as those previously depicted in FIG. 2. The operations begin at 802 by accessing a sparse matrix ($M_{r \times c}$) having r rows and c columns. At 804, a reference variable ("row") is initiated and set to a starting number (e.g., 1). From this point forward, row is used as a reference to the row in the sparse matrix being encoded. Thus, from 804 until the completion of the algorithm, row assumes the value of each integer between 1 and r exactly once.

At 806, an IEEE 754 8-byte representation of row is generated and the representation is stored as rowdouble. At 808, the variables numnonzero and col are initiated, and zero is assigned to both variables. In operations after 808, the variable numnonzero is used during the encoding of each row to count the number of non-zero elements in the row. From this point forward, the variable col is used as a reference to the column address of the sparse matrix element presently being evaluated.

At 810, the variable rowelements is initialized for storing binary sequences. At 812, a determination is made as to whether the sparse matrix element ($M_{row,col}$) is zero or non-zero. If the element $M_{row,col}$ is non-zero, a sequence of operations 814, 816, 818, 820, 824, 826 is executed. Otherwise, operation 824 is performed to determine if an escape condition associated with the end of the present row (row) has been satisfied. If it has not been satisfied, operation 826 is executed, followed again by operation 812. The process previously begun at 812 is then repeated until the escape condition at 824 is satisfied.

As described above, when $M_{row,col}$ is non-zero at 812, the sequence of operations 814, 816, 818, 820, 824, 826 is executed. In this sequence, numnonzero is incremented at 814. An IEEE 754 8-byte representation of col is generated at 816 and this representation is stored as this_col_double at 816. At 818, an IEEE 754 8-byte representation of $M_{row,col}$ is generated and this representation is assigned to this_element_double. At 820, an uninterrupted bit sequence is formed by concatenating rowelements, this_col_double, and this_element_double. The resultant sequence is assigned to rowelements. At 824, a determination is made as to whether col equals c. If col does not equal c, col is incremented at 826. Conversely, if col does equal c, the escape condition associated with reaching the end of the present row (row) has been satisfied.

When the escape condition at 824 satisfied, a sequence of operations 828, 830, 832, 834, 836, 838, 840 is executed. A final character string is generated (operations 828, 830, and 834) that represents the current row (row), a grid-computing device to which the text string should be sent is determined (operation 834), and the final text string is communicated to the grid-computing device (836).

The sequence of operations 828-840 is part of a loop that is repeated r times during execution of the algorithm shown in FIG. 9. More specifically, this loop is repeated once for each row in matrix M, with one iteration occurring after every c iterations of the loop involving the determinations at 812 and 824. At 828, an IEEE 754 8-byte representation of numnonzero is generated and the representation is stored as count_elements. At 830, a continuous bit sequence is formed by concatenating rowdouble, count_elements and rowelements, with the resulting bit sequence being assigned to row_binary_final. At 832, row_binary_final is encoded as a character string using Base64.

At 834, a grid-computing device ($node_x$) is identified. In the embodiment shown in FIG. 9, a variable x, which is used to distinguish which out of the p nodes the character string (row_binary_final) will be sent, is determined by adding 1 to the value of row−1 modulo p. Therefore, the destination node can change for each row. Specifically, the destination node will increment each time a new row is reached, until p is reached, at which point it will return back to the first node (e.g., $node_1$). This type of distribution scheme can be known as round-robin distribution. At 836, the character string (row_binary_final) is communicated to the destination node ($node_x$).

At 838, col is reset to 1. At 840, row is incremented so that a new row may be encoded. At block 842, a determination is made as to whether there are any remaining rows to be encoded. If there are no remaining rows to be encoded (e.g., the newly-incremented row variable is greater than r), the exit condition for the entire algorithm has been reached. At block 844, after the exit condition for the entire algorithm has been reached, the central control device 120 or working node will await processing results to be returned from the various nodes to which character strings have been communicated (e.g., at 836). If the exit condition for the entire algorithm has not been reached, row encoding operations begin again at 806. At that point, the operations continue as described previously, but now with row having been newly-incremented. This entire process continues until the exit condition at 842 is satisfied (e.g., row>r) by all rows having been encoded.

In certain embodiments, operations 802, 804, 806, 808, 810, 812, 814, 816, 818, 820, 824, 826, 828, 830, 832, 838, 840, and 842 are performed by a worker node and the resultant character string is stored in a database instead of communicated to another node. A full sparse matrix having r rows and c columns can be encoded and stored in a database in this fashion. In such embodiments, a central control device 120 can access the encoded sparse matrix from the database and perform operations 834, 836 for each row of the encoded sparse matrix, by transmitting the encoded character strings to the various destination nodes. The central control device 120 can also perform operation 844 to await processing results from the various destination nodes. Therefore, in some embodiments, the encoding operations can be performed by a worker node, the encoded sparse matrix can be stored in a database, the central control device 120 can access the encoded sparse matrix, the central control device 120 can transmit the character string from each row of the encoded sparse matrix to (e.g., through round-robin distribution, as described above) the various destination nodes, and the central control device 120 can wait processing results to be returned from the various destination nodes. Other variations can exist.

Figure 10:
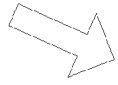
FIG. 10 depicts an example of a compressed version of a 3×10 sparse matrix after being encoded using Base64 encoding.

FIG. 10 depicts an example of a sparse matrix and the character strings that result from using the compression and encoding techniques that have been described herein. The sparse matrix is shown at 901. The sparse matrix 901 has 3 rows and 10 columns. Most of the 30 elements in the matrix 901 are zero-valued, and thus, the matrix 901 is sparse.

At 902, FIG. 10 shows row representations of the first, second and third rows of the sparse matrix 901. The row representation of the first row is the vector [1, 2, 4, 1, 10, 2]—which is depicted in FIG. 9 at 901 as a series of numbers without any vector notation. The character string below the first row representation is the result of encoding the row representation using Base64 encoding.

The row representation of the second row is the vector [2, 2, 1, 1, 5, 5]—which is also depicted in FIG. 10 at 901 as a series of numbers without any vector notation. The character string below the second row representation is the result of encoding the row representation using Base64 encoding.

The row representation of the third row is the vector [3, 1, 4, 3]—which is also depicted in FIG. 10 at 901 as a series of numbers without any vector notation. The character string below the third row representation is the result of encoding the row representation using Base64 encoding.

FIG. 11 is a flowchart that depicts an example of a series of operations for compressing and encoding a sparse matrix to facilitate parallelization of row operations in a system capable of parallel computing. At 1002, a representation of a sparse matrix is accessed. The represented sparse matrix includes multiple rows and columns. Each of the rows includes multiple zero elements and multiple non-zero elements, and each of the zero elements and each of the non-zero elements is indexed by a row index and a column index. The representation includes information about each of the non-zero elements, and the respective row indices and column indices of the non-zero elements.

At 1004, the representation of the sparse matrix is used in performing the following series of operations with respect to each row of the sparse matrix. The series of operations includes the operations depicted at 1006-1012.

The operation depicted at 1006 involves forming a platform-independent binary representation of each non-zero element of the row. A platform-independent binary representation of each non-zero element of a row can include taking data formatted using the List-Of-Lists format (e.g., row representations 502 in FIG. 7) and converting them to a binary double array encoded using IEEE 754 (e.g., row representations as sequence of IEEE 754 8-byte doubles 510 in FIG. 7). Platform-independent binary representations can likewise be formed for other data. Referring back to FIG. 11, the operation depicted at 1008 involves forming a platform-independent binary representation of each column index that indexes a non-zero element of the row. The operation depicted at 1010 involves forming a sequence of bits that represents the row and includes the representations of non-zero elements and the representations of column indices. The operation depicted at 1012 involves forming a character string that represents the row such that the character string is formed by encoding the sequence of bits using Base64 encoding.

At 1014, the character strings are distributed to grid-computing devices in a grid-computing system to facilitate parallelized statistical analysis of the sparse matrix.

Operations 1002, 1004, 1006, 1008, 1010, 1012, and 1014 can, but need not, occur sequentially. In some embodiments, operations 1002, 1004, 1006, 1008, 1010, and 1012 occur during the encoding process and the character strings that are generated are stored in a database (e.g., for later communication to grid-computing devices). In such embodiments, operation 1014 can occur at a different time, such as when the already-generated data (e.g., that has been stored in a database) is used in a distributed environment. Other variations can exist.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Certain aspects of the present disclosure provide various technical advantages and can enable the storage of high-dimensional sparse data in any database system. By encoding a high-dimensional sparse matrix, the resulting encoded matrix may be storable in a database system where the original, non-encoded high-dimensional sparse matrix would not be storable (e.g., because of the large number of elements). For example, in database systems that only support a few thousand columns in a table, a high-dimensional sparse data set consisting of millions of columns of data can be stored by encoding the high-dimensional sparse data according to certain aspects of the present disclosure. In addition, certain aspects of the present disclosure can be used to compress a sparse matrix by not storing the zero elements. The described techniques and systems require less computer memory, provide more efficient communications, and result in faster computer processing times.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

Specific details are given in the description to provide a thorough understanding of examples of configurations (including implementations). However, configurations may be practiced without these specific details. For example, well-known circuits, processes, algorithms, structures, and techniques have been shown without unnecessary detail in order to avoid obscuring the configurations. This description provides examples of configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional operations not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several examples of configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of operations may be undertaken before, during, or after the above elements are considered. Accordingly, the above description does not bound the scope of the claims.

The use of "capable of", "adapted to", or "configured to" herein is meant as open and inclusive language that does not foreclose devices adapted to or configured to perform additional tasks or operations. Additionally, the use of "based on" is meant to be open and inclusive, in that a process, operation, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-program product comprising a non-transitory machine-readable storage medium that stores instructions operable to cause a data processing apparatus to perform operations including:
    accessing a representation of a sparse matrix, wherein the sparse matrix includes multiple rows and columns, wherein each of the rows includes multiple zero elements and multiple non-zero elements, wherein each of the non-zero elements is indexable by a row index and a column index, and wherein the representation includes information about each of the non-zero elements and the respective row indices and column indices of the non-zero elements;
    forming a platform-independent binary representation of each non-zero element of a row of the sparse matrix, wherein forming the platform-independent binary representation of each non-zero element of the row of the sparse matrix comprises encoding each non-zero element of the row using a binary format that is compatible across different computing platforms of grid-computing devices in a grid-computing system;
    forming a platform-independent binary representation of each column index that indexes a non-zero element of the row, wherein forming the platform-independent binary representation of each column index comprises encoding each column index using the binary format that is compatible across the different computing platforms of grid-computing devices in the grid-computing system;
    forming a sequence of bits that represents the row and includes the representations of non-zero elements and the representations of column indices, wherein the sequence of bits represents a single row of the sparse matrix;
    forming a character string that represents the row, wherein the character string is formed by encoding the sequence of bits using Base64 encoding, and wherein the character string is decodable and decompressible to recreate the zero elements and non-zero elements of the row;
    distributively communicating the character string, wherein distributively communicating the character string includes communicating the character string to a grid-computing device in the grid-computing system to facilitate parallelized analysis of the sparse matrix; and
    recreating the row of the sparse matrix by decoding and decompressing the character string by the grid-computing device.

2. The computer-program product of claim 1, wherein encoding the sequence of bits using Base64 encoding includes:
    identifying multiple consecutive and non-overlapping intervals within the sequence of bits, wherein each of the intervals consists of six bytes within the sequence of bits; and
    mapping each of the intervals to a Base64 character based on the six bytes of the respective interval.

3. The computer-program product of claim 1, wherein the operations further include:
    appending error correction information to the character string, wherein error correction information appended to the character string indicates a number of non-zero elements in the row of the sparse matrix that is represented by the character string.

4. The computer-program product of claim 1, wherein the character string is dynamically stored by the grid-computing device subsequent to being distributively communicated.

5. The computer-program product of claim 1, wherein forming a platform-independent binary representation of each non-zero element of the row includes using a List-Of-Lists format.

6. The computer-program product of claim 1, wherein, each of the binary representations of the non-zero elements of the row complies with an IEEE 754 format standard.

7. The computer-program product of claim 1, wherein, each of the binary representations of a column index that indexes a non-zero element of the row complies with an IEEE 754 format standard.

8. The computer-program product of claim 1, wherein accessing the representation of the sparse matrix further includes performing run-length compression on each of the rows of the sparse matrix.

9. The computer-program product of claim 8, wherein performing run-length compression on each of the rows of the sparse matrix includes compressing the row using a Lists-Of-Lists format.

10. The computer-program product of claim 1, wherein the character string, when distributively communicated, is held in memory that is dynamically allocated for the character string.

11. The computer-program product of claim 1, wherein the sequence of bits represents a single row of the sparse matrix.

12. A system, comprising:
one or more data processors; and
a non-transitory computer readable storage medium containing instructions which when executed on the one or more data processors, cause the one or more processors to perform operations including:
accessing a representation of a sparse matrix, wherein the sparse matrix includes multiple rows and columns, wherein each of the rows includes multiple zero elements and multiple non-zero elements, wherein each of the non-zero elements is indexable by a row index and a column index, and wherein the representation includes information about each of the non-zero elements and the respective row indices and column indices of the non-zero elements;
forming a platform-independent binary representation of each non-zero element of a row of the sparse matrix, wherein forming the platform-independent binary representation of each non-zero element of the row of the sparse matrix comprises encoding each non-zero element of the row using a binary format that is compatible across different computing platforms of grid-computing devices in a grid-computing system;
forming a platform-independent binary representation of each column index that indexes a non-zero element of the row, wherein forming the platform-independent binary representation of each column index comprises encoding each column index using the binary format that is compatible across the different computing platforms of grid-computing devices in the grid-computing system;
forming a sequence of bits that represents the row and includes the representations of non-zero elements and the representations of column indices, wherein the sequence of bits represents a single row of the sparse matrix;
forming a character string that represents the row, wherein the character string is formed by encoding the sequence of bits using Base64 encoding, and wherein the character string is decodable and decompressible to recreate the zero elements and non-zero elements of the row;
distributively communicating the character string wherein distributively communicating the character string includes communicating the character string to the grid-computing device in a grid-computing system to facilitate parallelized analysis of the sparse matrix; and
recreating the row of the sparse matrix by decoding and decompressing the character string by the grid-computing device.

13. The system of claim 12, wherein encoding the sequence of bits using Base64 encoding includes:

identifying multiple consecutive and non-overlapping intervals within the sequence of bits, wherein each of the intervals consists of six bytes within the sequence of bits; and
mapping each of the intervals to a Base64 character based on the six bytes of the respective interval.

14. The system of claim 12, wherein, each of the binary representations of the non-zero elements of the row complies with an IEEE 754 format standard.

15. The system of claim 12, wherein each of the binary representations of a column index that indexes a non-zero element of the row complies with an IEEE 754 format standard.

16. The system of claim 12, wherein the operations further include:
appending error correction information to the character string, wherein error correction information appended to the character string indicates a number of non-zero elements in the row of the sparse matrix that is represented by the character string.

17. The system of claim 12, wherein accessing the representation of the sparse matrix further includes performing run-length compression on each the rows of the sparse matrix.

18. The system of claim 17, wherein performing run-length compression on each of the rows of the sparse matrix includes compressing the row using a Lists-Of-Lists format.

19. The system of claim 12, wherein the character string is dynamically stored by the grid-computing device subsequent to being distributively communicated.

20. The system of claim 12, wherein forming a platform-independent binary representation of each non-zero element of the row includes using a List-Of-Lists format.

21. The system of claim 12, wherein the character string, when distributively communicated, is held in memory that is dynamically allocated for the character string.

22. The system of claim 12, wherein the sequence of bits represents a single row of the sparse matrix.

23. A computer-implemented method, comprising:
accessing, by a computing device, a representation of a sparse matrix, wherein the sparse matrix includes multiple rows and columns, wherein each of the rows includes multiple zero elements and multiple non-zero elements, wherein each of the non-zero elements is indexable by a row index and a column index, and wherein the representation includes information about each of the non-zero elements and the respective row indices and column indices of the non-zero elements;
forming a platform-independent binary representation of each non-zero element of a row of the sparse matrix, wherein forming the platform-independent binary representation of each non-zero element of the row of the sparse matrix comprises encoding each non-zero element of the row using a binary format that is compatible across different computing platforms of grid-computing devices in a grid-computing system;
forming a platform-independent binary representation of each column index that indexes a non-zero element of the row, wherein forming the platform-independent binary representation of each column index comprises encoding each column index using the binary format that is compatible across the different computing platforms of grid-computing devices in the grid-computing system;
forming a sequence of bits that represents the row and includes the representations of non-zero elements and the representations of column indices, wherein the sequence of bits represents a single row of the sparse matrix;

forming a character string that represents the row, wherein the character string is formed by encoding the sequence of bits using Base64 encoding, and wherein the character string is decodable and decompressible to recreate the zero elements and non-zero elements of the row;

distributively communicating the character string wherein distributively communicating the character string includes communicating the character string to a grid-computing device in the grid-computing system to facilitate parallelized analysis of the sparse matrix; and recreating the row of the sparse matrix by decoding and decompressing the character string by the grid-computing device.

24. The method of claim 23, wherein encoding the sequence of bits using Base64 encoding includes:

identifying multiple consecutive and non-overlapping intervals within the sequence of bits, wherein each of the intervals consists of six bytes within the sequence of bits; and mapping each of the intervals to a Base64 character based on the six bytes of the respective interval.

25. The method of claim 23, further comprising:

appending error correction information to the character string, wherein error correction information appended to the character string indicates a number of non-zero elements in the row of the sparse matrix that is represented by the character string.

26. The method of claim 23, wherein the character string is dynamically stored by the grid-computing device subsequent to being distributively communicated.

27. The method of claim 23, wherein forming a platform-independent binary representation of each non-zero element of the row includes using a List-Of-Lists format.

28. The method of claim 23, wherein, each of the binary representations of the non-zero elements of the row complies with an IEEE 754 format standard.

29. The method of claim 23, wherein, each of the binary representations of a column index that indexes a non-zero element of the row complies with an IEEE 754 format standard.

30. The method of claim 23, wherein accessing the representation of the sparse matrix further includes performing run-length compression on each of the rows of the sparse matrix.

31. The method of claim 30, wherein performing run-length compression on each of the rows of the sparse matrix includes compressing the row using a Lists-Of-Lists format.

32. The method of claim 23, wherein the character string, when distributively communicated, is held in memory that is dynamically allocated for the character string.

33. The method of claim 23, wherein the sequence of bits represents a single row of the sparse matrix.

* * * * *